United States Patent
Hermans

(10) Patent No.: US 12,296,294 B2
(45) Date of Patent: May 13, 2025

(54) DRYING DEVICE AND METHOD FOR DRYING COMPRESSED GAS

(71) Applicant: ATLAS COPCO AIRPOWER, NAAMLOZE VENNOOTSCHAP, Wilrijk (BE)

(72) Inventor: Hans Maria Karel Hermans, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 398 days.

(21) Appl. No.: 17/781,160

(22) PCT Filed: Dec. 28, 2020

(86) PCT No.: PCT/IB2020/062470
§ 371 (c)(1),
(2) Date: May 31, 2022

(87) PCT Pub. No.: WO2021/137126
PCT Pub. Date: Jul. 8, 2021

(65) Prior Publication Data
US 2023/0001345 A1    Jan. 5, 2023

(30) Foreign Application Priority Data

Jan. 2, 2020 (BE) .................................. 2020/4999

(51) Int. Cl.
*B01D 53/04* (2006.01)
*B01D 53/26* (2006.01)

(52) U.S. Cl.
CPC ..... *B01D 53/0438* (2013.01); *B01D 53/0446* (2013.01); *B01D 53/0454* (2013.01);
(Continued)

(58) Field of Classification Search
CPC .......................... B01D 53/04; B01D 53/0454; B01D 53/0423; B01D 53/0438; B01D 53/26
See application file for complete search history.

(56) References Cited

U.S. PATENT DOCUMENTS 9,744,496 B1 *  8/2017  Chrivia ................ B01D 53/261
2007/0295205 A1  12/2007  Vertriest
2014/0260967 A1   9/2014  Gitschlag

FOREIGN PATENT DOCUMENTS

GB       1521297 A     8/1978
JP     S60-087830 A    5/1985
(Continued)

OTHER PUBLICATIONS

International Search Report and Written Opinion in corresponding PCT Application No. PCT/IB2020/062470, dated April 9, 2021.
(Continued)

*Primary Examiner* — Sharon Pregler
(74) *Attorney, Agent, or Firm* — BACON&THOMAS, PLLC

(57) ABSTRACT

Method for drying compressed gas by means of a drying device with an inlet and an outlet including at least two vessels filled with a regenerable desiccant and a controllable valve system including a first and a second valve block connecting the inlet, respectively the outlet to the vessels. The valve system is being regulated such that one vessel will dry compressed gas, while the other vessel is successively regenerated and cooled. The method includes a first and a second cooling cycle. The first cooling cycle includes passing ambient air through the vessel to be cooled. The second cooling cycle includes branching off, expanding and sending dried compressed gas through the outlet to be branched off and then blowing it off through the vessel to be cooled, using (Continued)

either the first or the second cooling cycle, or both, depending on predetermined conditions.

11 Claims, 2 Drawing Sheets

(52) U.S. Cl.
CPC ........ *B01D 53/261* (2013.01); *B01D 2257/80* (2013.01); *B01D 2259/40003* (2013.01); *B01D 2259/4009* (2013.01); *B01D 2259/402* (2013.01)

(56) References Cited

FOREIGN PATENT DOCUMENTS

| | | |
|---|---|---|
| JP | S61-204629 U | 12/1986 |
| RU | 2289760 C1 | 12/2006 |
| RU | 2481145 C2 | 5/2013 |
| RU | 2683827 C1 | 4/2019 |

OTHER PUBLICATIONS

BE Search Report in corresponding BE Application No. 202004999, dated Sep. 21, 2020.
Written Opinion of the International Preliminary Examining Authority in corresponding PCT Application No. PCT/IB2020/062470, dated Dec. 2, 2021.
International Preliminary Report on Patentability in corresponding PCT Application No. PCT/IB2020/062470, dated May 4, 2022.
JP Office Action in corresponding JP Application No. 2022-538738, dated Jul. 3, 2023.
Russian Search Report in corresponding RU Application No. 2022120354/04, dated Mar. 2, 2023.

* cited by examiner

DRYING DEVICE AND METHOD FOR DRYING COMPRESSED GAS

The current invention relates to a method and drying device for drying compressed gas.

BACKGROUND OF THE INVENTION

More specifically, the invention is intended for drying devices fitted with an inlet for compressed gas to be dried and an outlet for dried compressed gas, wherein the drying device includes at least two vessels filled with a regenerable desiccant and a controllable valve system connecting the aforementioned inlet and outlet to the aforementioned vessels, wherein the controllable valve system is such that at least one vessel will dry compressed gas, while the other vessel is successively regenerated and cooled, wherein the vessels will each in turn be drying compressed gas by regulation of the valve system.

Regenerable desiccant means a desiccant that can absorb moisture from a gas by adsorption and, when saturated with moisture, can be dried by transmitting a so-called regeneration gas through it. This process is also called regeneration of the desiccant. The regeneration gas is typically a hot gas.

Although this is the principle of adsorption, the invention can also be applied to the principle of absorption.

When a vessel will dry, it will absorb moisture from the compressed gas to be dried, saturating the desiccant.

This vessel is then regenerated, typically allowing warm air to pass through it. This warm air will extract moisture from the desiccant and regenerate it.

Before the vessel is used again to dry compressed gas, it will first be cooled.

Methods are already in place wherein part of the dried compressed gas is branched off and expanded at the outlet of the drying device. As a result, the gas will cool down and then pass through the vessel to cool it down.

Afterwards, the used gas is blown off.

This method has the disadvantage that one loses part of the compressed and dried air to be able to cool the vessel, which is obviously undesirable.

There are also methods in which ambient air is passed through the vessel in question.

This can be sucked in, for example, by means of a blower or the like.

It is possible that the sucked in air is passed through the vessel a number of times, passing each time through an air-to-air cooler to be cooled down.

A disadvantage of this is that it is never possible to cool below the ambient temperature. At high ambient temperatures, there is a risk that the sucked in air will be insufficiently cooled, so that the temperature of the vessel will not drop sufficiently after cooling.

In addition, if the cooler fails, the sucked in air will not be cooled, which can also cause the temperature of the vessel to drop insufficiently.

As a result, the vessel will not be able to extract as much moisture from the gas to be dried during its next adsorption cycle.

The remaining moisture in the compressed gas can cause problems for the final consumers.

Another disadvantage is that by using ambient air, moisture will also enter the vessel.

As a result, the dew point at the outlet of the drying device can become too high, which is obviously undesirable.

SUMMARY OF THE INVENTION

This invention aims at solving at least one of the aforementioned and other disadvantages.

To this end, the invention concerns a method for drying compressed gas by means of a drying device with an inlet for compressed gas to be dried and an outlet for dried compressed gas, comprising at least two vessels filled with a regenerable desiccant and a controllable valve system consisting of a first valve block and a second valve block which connects the aforementioned inlet, respectively the outlet, to the aforementioned vessels, wherein the controllable valve system is being regulated as such that at least one vessel will dry compressed gas, while the other vessel is successively regenerated and cooled, wherein, by regulating the valve system, the vessels dry each in turn compressed gas, characterized in that the method consists of providing a first and a second cooling cycle to cool the vessel being cooled, with the first cooling cycle consisting of sending ambient air through the vessel and the second cooling cycle consisting of drying, to branch off compressed gas at the aforementioned outlet, expand it and pass it through the vessel to be cooled, after which this gas is then blown off, applying the first or second cooling cycle, or both, depending on predetermined conditions.

An advantage of such a method is that one will always be able to cool with the first cooling cycle, which is the most energy efficient, but still, if necessary and by choosing the predetermined conditions appropriately, one will be able to apply the second cooling cycle which is much more robust and secure as a kind of 'fail-safe'.

In this way, the compressed gas is always properly dried, even if, for example, the ambient temperature becomes too high, and in addition, the second cooling cycle is only used under the conditions that it is necessary.

In a preferred embodiment, after the vessel being cooled with the first cooling cycle, the method consists of measuring or determining the temperature in this vessel or at the outlet of this vessel and, if this temperature is higher than a predetermined maximum temperature, additional cooling of this vessel with the second cooling cycle.

This has the advantage that always the most energy efficient first cooling cycle will be used to cool the vessel.

The second cooling cycle will only be used to further reduce the temperature of the vessel if necessary.

In addition, when the second cooling cycle is switched on, this second cooling cycle will only have to perform a limited additional cooling, which means that it will have to be used for a shorter period of time.

In another preferred embodiment, the method includes the step of determining or measuring the dew point at the outlet or determining or measuring an average dew point at the outlet over a predetermined period of time prior to cooling the vessel being cooled, and:

if this dew point is equal to or higher than a predetermined maximum dew point, cool this vessel with the second cooling cycle; and if this dew point is lower than the predetermined maximum dew point, cool this vessel with the first cooling cycle.

In this case, if the dew point is too high, only the second cooling cycle will be applied. Dry air is used for the second cooling cycle, so that moisture can also be extracted from the vessel in question during the cooling process.

In this way, the vessel will be dried at the same time and additionally regenerated.

It is important to note that the dew point is thus determined or measured when the vessel in question is in the adsorption phase, i.e. the dew point is determined or measured when the vessel in question is drying gas.

It is also possible to measure or determine the dew point during all or part of the adsorption phase and then take an average of it.

The invention also concerns a drying device which will allow the aforementioned method to be applied, i.e. to be able to apply both the first and second cooling cycles.

To this end, the invention has as object a drying device for drying compressed gas, which drying device is equipped with an inlet for compressed gas to be dried and an outlet for dried compressed gas, wherein the drying device includes at least two vessels filled with a regenerable desiccant and a controllable valve system consisting of a first valve block and a second valve block which connects the aforementioned inlet, respectively the aforementioned outlet, to the aforementioned vessels, wherein the valve system is being regulated as such that at least one vessel will dry compressed gas, while the other vessel is successively regenerated and cooled, the vessels drying each in turn the compressed gases being controlled by the valve system, characterized in that the drying device is further equipped with a blower to suck in ambient air, a gas release port and a four-way valve that will allow either the blower or the gas release port to be connected to the vessels via the "first" valve block in such a way that, when the four-way valve connects the blower to the "first" valve block, the ambient air sucked in by the blower can enter the vessel being cooled via the four-way valve and the "first" valve block, in which the drying device is further equipped with a branch pipe capable of branching off dried compressed gas, expanding it and leading it through the 'second' valve block to the vessel being cooled in such a way that, when the four-way valve connects the gas release port with the 'first' valve block, the branched gas can, after passing through the vessel being cooled, be discharged through the gas release port.

An advantage of such a drying device is that it will allow the use of a method according to the invention, i.e. to apply both the first cooling cycle and the second cooling cycle.

By cleverly controlling the components of the drying device, in particular the four-way valve and the valve system, all necessary circuits can be created in a relatively compact way.

It goes without saying that all the aforementioned advantages of the method can also be applied to the device.

BRIEF DESCRIPTION OF THE DRAWINGS

To better demonstrate the characteristics of the invention, the following describes, by way of example without any restrictive character, a number of preferred embodiments of a method and a drying device in accordance with the invention, with reference to the accompanying drawings, in which.

DETAILED DESCRIPTION OF THE INVENTION

Figure 1:
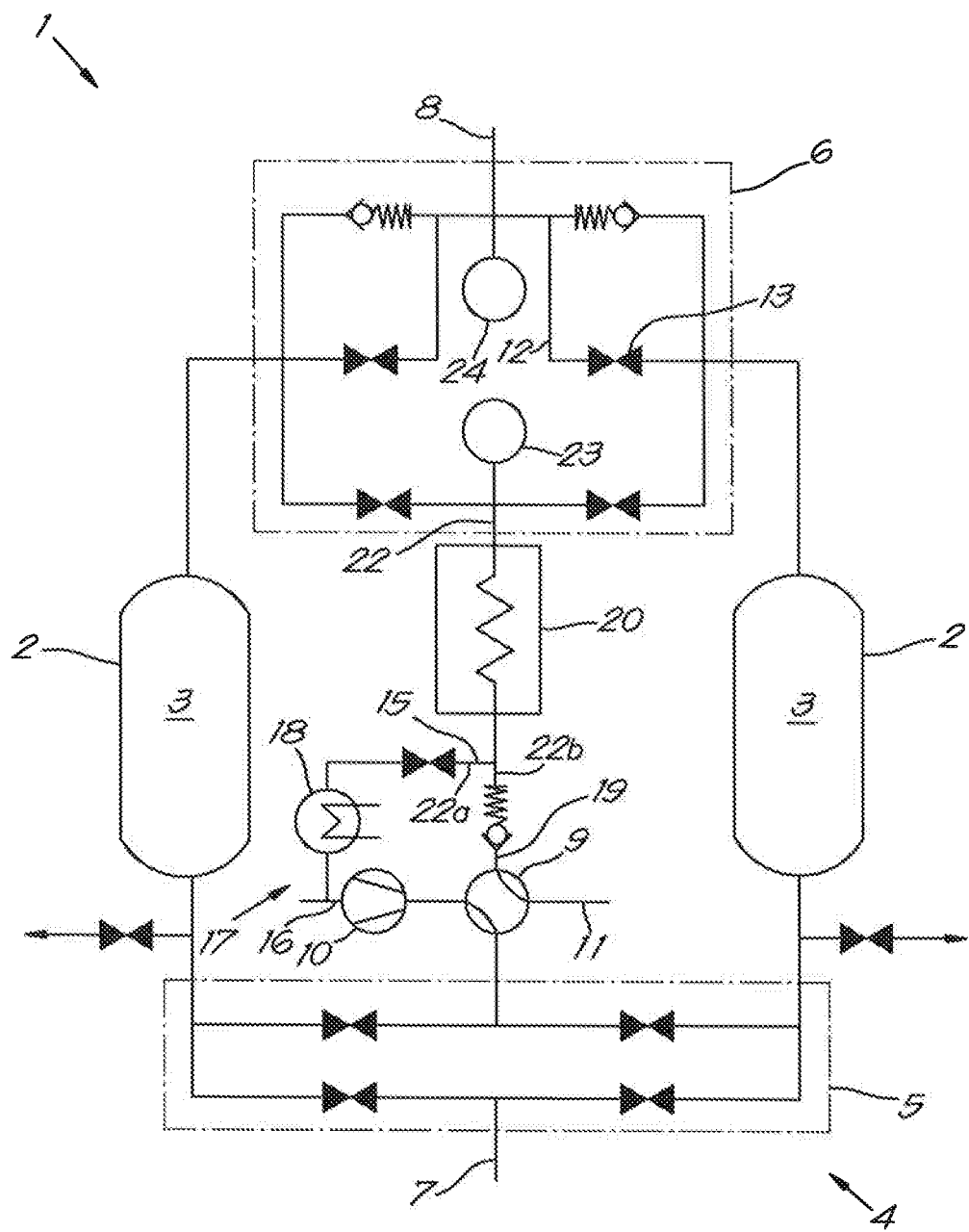
FIG. 1 schematically shows a drying device in accordance with the invention.

The drying device 1 schematically shown in FIG. 1 according to the invention for drying compressed gas consists essentially of two vessels 2 filled with a moisture absorber 3.

This regenerable moisture absorber 3 is also called desiccant.

It is of course possible that there are more than two vessels 2.

The drying device 1 further comprises a valve system 4 consisting of a first valve block 5 and a second valve block 6.

The first valve block 5 will connect vessels 2 to an inlet 7 for dried compressed gas, while the second valve block 6 will connect vessels 2 to an outlet 8 for dried compressed gas.

The aforementioned valve blocks 5, 6 are a system of different pipes and valves which can be regulated in such a way that at any one time at least one vessel 2 is being regenerated, while the other vessel 2 or the other vessels 2 are drying the compressed gas, wherein by regulating the valve system 4 the vessels 2 will each in turn dry compressed gas.

Figure 2:
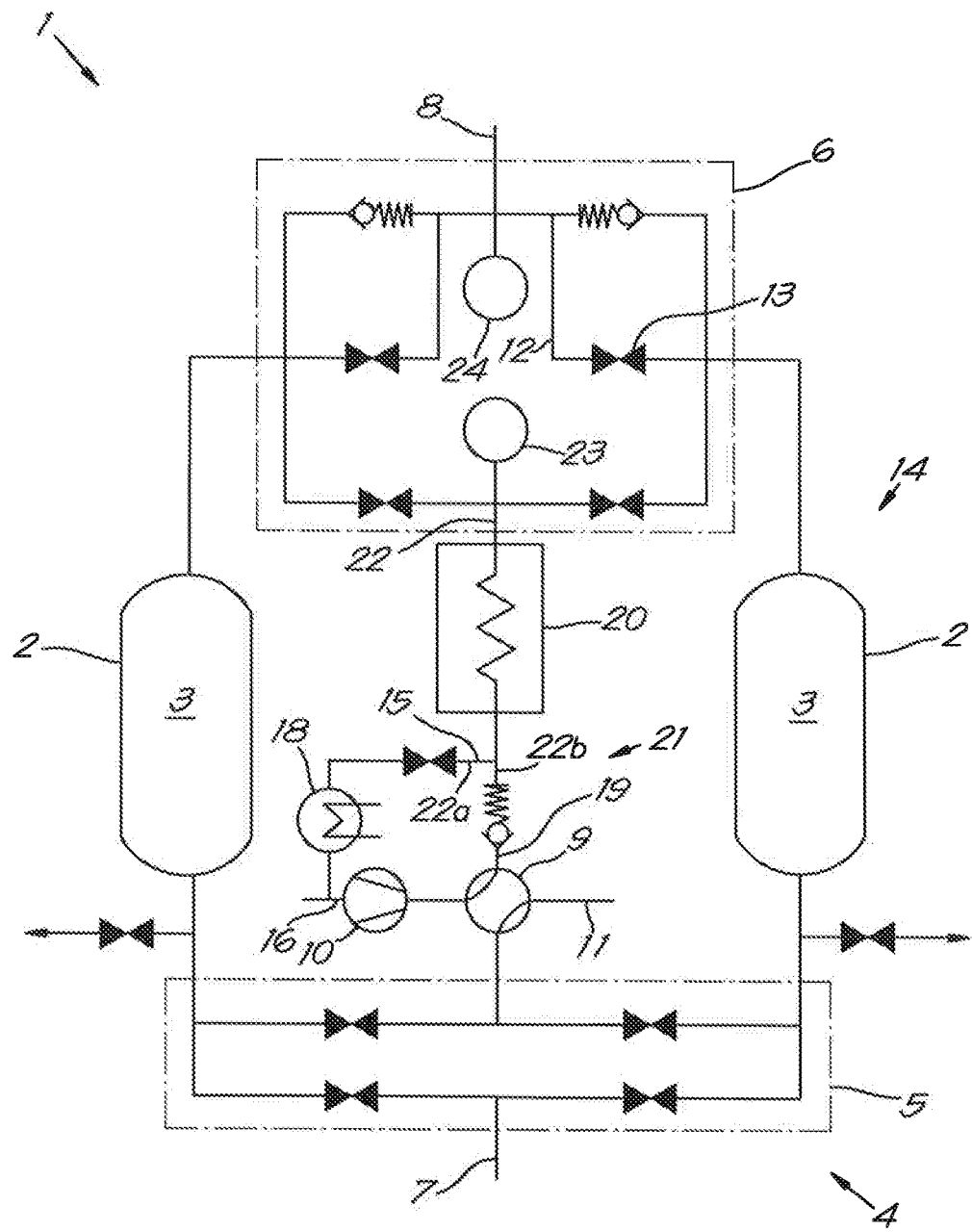
FIG. 2 schematically shows the drying device in FIG. 1, but in a different position.

Furthermore, according to the invention, the drying device 1 is equipped with a four-way valve 9, a blower 10 for the intake of ambient air and a gas release port 11 for the release of gas, which are configured in such a way that in a first position of the four-way valve 9 the blower 10 is connected to the vessels 2 via the first valve block 5, as shown in FIG. 1, and in a second position of the four-way valve 9 the gas release port 11 is connected to the vessels 2 via the first valve block 5, as shown in FIG. 2.

Of course, it is not excluded that instead of a blower 10, other means are provided for the intake of ambient air.

It is also possible that instead of a four-way valve 9, a valve block with, for example, four valves or air inlets or other means can be used that can achieve the same configuration as the four-way valve 9.

As shown in FIG. 1, the drying device 1 is such that in the first position of the four-way valve 9, the ambient air sucked in by the blower 10 through the four-way valve 9 and the first valve block 5 can enter the vessel 2 which is being cooled.

Of course, the valve block 5 is regulated in the appropriate way to enable the right flow path for the gas.

In addition, the drying device 1 is equipped with a branch pipe 12 which can branch off dried compressed gas, expand it and lead it via the second valve block 6 to the vessel 2 which is being cooled.

In this case, the aforementioned branch pipe 12 contains an expansion valve 13 to expand the branched dried compressed gas.

The aforementioned branch pipe 12 is preferably at least partially integrated in, or at least part of, the second valve block 6.

In this case, the branch pipe 12 is fully integrated in the second valve block 6.

As shown in FIG. 2, the drying device 1 is such that, when the four-way valve 9 is in the second position, the branched off gas can be blown off through the gas release port 11 after passing through the vessel 2 which is cooled.

Of course, the valve block 6 is regulated in the appropriate way to enable the right flow path for the gas.

In other words, an open cooling circuit 14 is formed, consisting of the branch pipe 12, the second valve block 6, the vessel 2 being cooled, the first valve block 5, the four-way valve 9 and the gas release port 11. This aforementioned open cooling circuit 14 will be used for the second cooling cycle, as explained below.

In the example shown in FIGS. 1 and 2, but not necessary for the invention, the drying device 1 is equipped with a cooling pipe 15 connecting the second valve block 6 to the inlet side 16 of the blower 10.

From the figures it can be seen that a closed cooling circuit 17 will be formed when the four-way valve 9 is in the aforementioned first position, which is formed successively by the blower 10, the four-way valve 9, the first valve block 5, a vessel 2, the second valve block 6 and the cooling pipe 15.

As can be seen in the figures, the cooling pipe 15 contains a cooler 18. This cooler 18 can be, for example, an air-to-air cooler 18.

The aforementioned closed cooling circuit 17 will be used for the first cooling cycle, as explained below.

However, it is also possible for the invention to use an open circuit for the first cooling cycle. In this case, the aforementioned cooling pipe 15 with cooler 18 will be absent, but will be replaced by a gas release port, release valve or similar connected to the second valve block 6. The open circuit for the first cooling cycle then consists of the blower 10, the four-way valve 9, the first valve block 5, a vessel 2, the second valve block 6 and the gas release port or release valve.

In addition, the drying device 1 is equipped with a regeneration pipe 19 which connects the four-way valve 9 to the second valve block 6.

In the second position of the four-way valve 9, when the four-way valve 9 connects gas release port 11 to the first valve block 5, the four-way valve 9 will connect the blower 10 to the regeneration pipe 19 and thus to the second valve block 6.

This regeneration pipe 19 is equipped with a heater 20, in this case an electric heater 20.

As can be seen from FIG. 2, in the second position of the four-way valve 9, a regeneration circuit 21 is formed comprising the blower 10, the four-way valve 9, the regeneration pipe 19 with the heater 20, the second valve block 6, the vessel 2 being regenerated, the first valve block 5, the four-way valve 9 and the gas release port 11.

In the second position of the four-way valve 9 a regeneration circuit 21 is formed as well as the open cooling circuit 14 that is used for the second cooling cycle. The regeneration circuit 21, or the open cooling circuit 14, will be realized by an appropriate regulation of the valve blocks 5, 6.

As can be seen in the figures, in this case the regeneration pipe 19 and the cooling pipe 15 partially coincide.

In this case, only one pipe 22 will leave from the second valve block 6, which also includes the aforementioned heating 20. The aforementioned pipe 22 splits into two separate pipes 22a, 22b, one of which leads to the inlet side 16 of the blower 10, in which the cooler 18 is included, and one to the four-way valve 9.

It goes without saying that, in addition to the appropriate regulation of valve blocks 5, 6 and the four-way valve 9, the aforementioned heating 20 and cooler 18 are also appropriately controlled when implementing the open cooling circuit 14, the closed cooling circuit 17 and the regeneration circuit 21.

Finally, the drying device 1 in this case, but not necessary for the invention, includes a temperature sensor 23 which can measure the temperature of the vessels 2 and a dew point sensor 24 which can measure the dew point at the outlet of the vessels 2. Both sensors 23, 24 in this case are located at the outlet side of the vessels 2, i.e. the side of the vessels 2 connected to the outlet 8 of the drying device 1.

The operation of the drying device 1 and the method according to the invention for drying compressed gas using the drying device 1 is very simple and as follows.

During the operation of the drying device 1, compressed gas to be dried will enter the vessel 2 which is drying through the inlet 7.

When passing through this vessel 2, the desiccant 3 will extract moisture from the gas.

The dried compressed gas will leave the drying device 1 through the outlet 8.

The other vessel 2, which has already dried gas during a previous cycle, contains moisture and is regenerated in the meantime.

A regeneration cycle is used, which consists of heating ambient air and sending it through the relevant vessel 2 and then blowing it off.

For this regeneration cycle, the aforementioned regeneration circuit 21 is used.

For this purpose, the four-way valve 9 is placed in the second position and valve blocks 5, 6 are regulated in such a way that the regeneration circuit 21 is realized. In this case, the heating 20 is also switched on.

The blower 10 will suck in ambient air which passes through the regeneration pipe 19 along the heater 20 where the gas is heated.

Via the second valve block 6, the heated gas will be brought to the aforementioned other vessel 2, wherein it will draw moisture from the desiccant when passing through this vessel 2.

Via the first valve block 5, the hot, moist gas will leave the drying device 1 through the gas release port 11.

After the regeneration cycle, the heating 20 will be switched off.

When the desiccant 3 is regenerated, the vessel 2 will be cooled.

To this end, the method is applied according to the invention, which essentially consists of providing a first cooling cycle and a second cooling cycle.

For the first cooling cycle the closed cooling circuit 17 is used, wherein ambient air is sent through the vessel 2 that is being cooled.

For the second cooling cycle, the open cooling circuit 14 is used, wherein dried compressed gas at the outlet 8 is branched off, expanded and passed through the vessel 2 that is being cooled, after which this gas is blown off.

The method consists of applying either the first or the second cooling cycle, or both, on the basis of predetermined conditions.

In a first alternative embodiment of the method, the method consists of cooling the vessel 2 in question with the first cooling cycle, using the closed cooling circuit 17 and the cooler 18.

The ambient air sucked in by the blower 10 will be circulated through the closed cooling circuit 17, after passing through the vessel 2, it will be cooled by the cooler 18. This cooled gas will then again be passed through the vessel 2 via the blower 10.

After the vessel 2 has been cooled with the first cooling cycle, the temperature of the vessel 2 is measured using the temperature sensor 23 provided for this purpose.

If this temperature is higher than a predetermined maximum temperature $T_{max}$, this vessel 2 will be additionally cooled with the second cooling cycle.

The four-way valve 9 will then be switched to the position shown in FIG. 2, after which the second cooling cycle can be started, using the open cooling circuit 14 to cool the vessel 2 additionally, using the expanded and thus cooled dried compressed gas.

In order to expand the branched, dried compressed gas, the expansion valve 13 is used.

In a second alternative embodiment of the method, the method consists of determining or measuring the dew point at the outlet 8 using the dew point sensor 24 provided for this purpose before the vessel concerned is cooled 2.

If the dew point is lower than a predetermined maximum dew point $DP_{max}$, the vessel 2 will be cooled with the first cooling cycle.

However, if the dew point is equal to or higher than the predetermined maximum dew point $DP_{max}$, the vessel 2 will be cooled with the second cooling cycle.

As mentioned above, during this second cooling cycle an additional drying of the desiccant 3 will take place in the vessel 2, causing the dew point to drop.

After completing the cooling of the vessel 2, this vessel 2 can be used to dry compressed gas, while the other vessel 2, previously used for drying, can now be regenerated and cooled in accordance with the aforementioned method.

Although in the aforementioned example of the method, for the first cooling cycle a closed cooling circuit 17 is used, after the ambient air is sucked in by means of a blower 10 or similar and the ambient air then circulates in the closed cooling circuit 17, it is not excluded that a non-closed circuit is used in which the sucked in ambient air is blown off after passing through the vessel 2 that is being cooled.

This has the advantage that no cooler 18 is needed.

A disadvantage is that new ambient air is sucked in all the time to cool vessel 2.

As a result, if the ambient air is very moist, it is possible that too much moisture enters the vessel 2, which can cause the dew point at outlet 8 to rise too much.

In this case, the aforementioned second alternative embodiment of the invention will be very advantageous, as it will allow the dew point to be lowered if necessary.

Another aspect of the invention concerns a method for drying compressed gas by means of a drying device with an inlet for the compressed gas to be dried and an outlet for the dried compressed gas, comprising at least two vessels filled with a regenerable desiccant and a controllable valve system consisting of a first valve block and a second valve block connecting the aforementioned inlet, respectively outlet to the aforementioned vessels, wherein the controllable valve system is being regulated as such that at least one vessel will dry compressed gas, while the other vessel is successively regenerated and cooled, wherein by regulating the valve system the vessels dry each in turn compressed gas, characterized in that the method consists of providing a regeneration cycle to regenerate a vessel which is being regenerated, wherein this regeneration cycle consists of heating ambient air, passing it through the vessel concerned and then blowing it off.

This means applying the aforementioned regeneration cycle in a known drying device 1, i.e. without necessarily having to apply the first and second cooling cycles.

The present invention is by no means limited to the embodiments described as examples and shown in the figures, but a method and device according to the invention can be implemented in all shapes and sizes without going beyond the scope of the invention.

The invention claimed is:

1. A method for drying compressed gas by means of a drying device with an inlet for compressed gas to be dried and an outlet for dried compressed gas, which drying device comprises at least two vessels filled with a regenerable desiccant and a controllable valve system comprising a first valve block which connects the inlet to the at least two vessels and a second valve block which connects the outlet to the at least two vessels, the controllable valve system being regulated such that at least one vessel will dry compressed gas, while the other vessel will be regenerated and cooled successively, wherein, by regulating the valve system, the vessels each, in turn, dry compressed gas,
   wherein the drying device further comprises a blower to suck in ambient air, and a gas release port to blow off gas that has passed through at least one of the vessels,
   wherein the method comprises steps of:
   drying the compressed gas by passing the compressed gas through one of the at least two vessels,
   regenerating the regenerable desiccant by heating air and passing the heated air though said one of the at least two vessels, and
   after regenerating the regenerable desiccant, cooling said one of the at least two vessels, wherein the step of cooling the one of the at least two vessels comprises a step of:
   providing a first and a second cooling cycle to cool said one of the at least two vessels, and applying either the first cooling cycle, the second cooling cycle, or both the first and second cooling cycle based on a predetermined condition, wherein:
   the first cooling cycle comprises passing ambient air through said one of the least two vessels, and
   the second cooling cycle comprises branching off dried compressed gas at the outlet of the drying device, expanding the dried compressed air, and passing it through said one of the least two vessels, after which the gas that has been passed through said one of the at least two vessels is blown off through the gas release port,
   wherein the predetermined condition is at least one of:
   a temperature in or at an outlet side of said one of the at least two vessels, or
   a measured or average dew point at the outlet side of said at least one of the at least two vessels, and
   wherein the method further comprises, for the first cooling cycle, using a closed cooling circuit including a cooling pipe connecting the second valve block with an inlet side of the blower in which, after the ambient air is sucked in, the ambient air is then circulated in a closed cooling circuit.

2. The method according to claim 1, wherein the method includes a step of measuring or determining the temperature in said at least one of the two vessels or at the outlet of said at least one of the two vessels after said at least one of the two vessels has been cooled with the first cooling cycle and, if this temperature is higher than a predetermined maximum temperature (Tmax), providing additional cooling of said at least one of the two vessels with the second cooling cycle.

3. The method according to claim 1, wherein the method includes a step of determining or measuring the dew point at the outlet or determining or measuring an average dew point at the outlet over a predetermined period of time before the vessel is cooled, and
   if the dew point is equal to or higher than a predetermined maximum dew point (DPmax), cooling said at least one of the two vessels by applying the second cooling cycle; and
   if the dew point is lower than the predetermined maximum dew point (DPmax), cooling said at least one of the two vessels with the first cooling cycle.

4. The method according to claim 1, wherein for the second cooling cycle, the method further comprises using an expansion valve to expand the gas branched, dried, compressed at the outlet.

5. The method according to claim 1, wherein the step of regenerating the regenerable desiccant includes steps of heating ambient air, passing it through said one of the at least two vessels and then blowing off the heated ambient air that has passed through said one of the at least two vessels.

6. A drying device for drying compressed gas, which drying device comprises:
   an inlet for compressed gas to be dried and an outlet for dried compressed gas;
   at least two vessels filled with a regenerable desiccant;
   a controllable valve system comprising a first valve block which connects the inlet to the at least two vessels and a second valve block which connects the the outlet with the at least two vessels, wherein the controllable valve system is configured to be regulated such that at least one vessel will dry compressed gas, while the other vessel is successively regenerated and cooled, wherein the vessels each in turn dry compressed gas;
   a blower to suck in ambient air, a gas release port and a four-way valve, wherein the first or second valve block is configured to allow either the blower or the gas release port to be connected to the vessels via the first valve block, in such a way that when the four-way valve connects the blower with the first valve block, the ambient air sucked in by the blower enters the vessel to be cooled via the four-way valve and the first valve block;
   a branch pipe configured to branch off dried compressed gas, expand the dried compressed gas and lead the dried compressed gas via the second valve block to the vessel to be cooled, wherein when the four-way valve connects the gas release port with the first valve block, the dried compressed gas that has been directed to the branch pipe and then expanded is blown off via the gas release port after passing through the vessel to be cooled, and
   a cooling pipe connecting the second valve block with an inlet side of the blower to form a closed cooling circuit when the four-way valve connects the blower to the first valve block, wherein the closed cooling circuit is formed successively by the blower, the four way-valve, the first valve block, one of the at least two vessels, the second valve block and the cooling pipe.

7. The drying device according to claim 6, wherein the cooling pipe is provided with a cooler.

8. The drying device according to claim 6, wherein the drying device further comprises a regeneration pipe which includes a heater, which regeneration pipe connects the four-way valve with the second valve block, wherein, when the four-way valve connects the gas release port with the first valve block, the four-way valve connects the blower to the regeneration pipe and thus to the second valve block in such a way that a regeneration circuit is formed comprising the blower, the four-way valve, the regeneration pipe with the heater, the second valve block, said one of the at least two vessels, the first valve block, the four-way valve and the gas release port.

9. The drying device according to claim 8, wherein the regeneration pipe and the cooling pipe partially coincide.

10. The drying device according to claim 6, wherein the branching pipe comprises an expansion valve.

11. The drying device according to claim 6, wherein the branching pipe is integrated in, or part of, the second valve block.

* * * * *